(12) United States Patent
Huang et al.

(10) Patent No.: US 9,963,095 B2
(45) Date of Patent: May 8, 2018

(54) ELECTRICAL POWER SYSTEM FOR AN AIRCRAFT

(71) Applicant: GE Aviation Systems Limited, Cheltenham (GB)

(72) Inventors: Hao Huang, Troy, OH (US); Adrian Shipley, Cheltenham (GB)

(73) Assignee: GE Aviation Systems Limited, Cheltenham (GB)

( * ) Notice: Subject to any disclaimer, the term of this patent is extended or adjusted under 35 U.S.C. 154(b) by 508 days.

(21) Appl. No.: 14/266,940

(22) Filed: May 1, 2014

(65) Prior Publication Data

US 2015/0123463 A1    May 7, 2015

(30) Foreign Application Priority Data

Nov. 6, 2013   (GB) .................................. 1319585.4

(51) Int. Cl.
  *B60R 16/03*     (2006.01)
  *F01D 15/10*    (2006.01)
  *H02J 1/10*     (2006.01)

(52) U.S. Cl.
  CPC ............. *B60R 16/03* (2013.01); *F01D 15/10* (2013.01); *H02J 1/10* (2013.01); *Y02T 50/671* (2013.01)

(58) Field of Classification Search
  CPC .... B60R 16/03; B64D 41/00; B64D 2221/00; F01D 15/10; F02C 6/00; F02C 7/32; F02C 7/36; F05D 2220/76; F05D 2220/762; H02J 1/10; H02J 3/38; H02K 7/18; H02K 19/16; H02P 9/10; Y02T 50/52–50/54; Y02T 50/545; Y02T 50/671

USPC .......................................................... 307/9.1
See application file for complete search history.

(56) References Cited

U.S. PATENT DOCUMENTS

| | | | | |
|---|---|---|---|---|
| 6,124,646 A * | 9/2000 | Artinian | ................. | B64D 13/06 290/52 |
| 6,467,725 B1 * | 10/2002 | Coles | ...................... | F01D 15/10 244/58 |
| 7,605,483 B2 * | 10/2009 | Kern | ....................... | H02P 9/302 290/4 A |

(Continued)

FOREIGN PATENT DOCUMENTS

| EP | 1947311 A2 | 7/2008 |
|---|---|---|
| EP | 2460730 A2 | 6/2012 |

(Continued)

OTHER PUBLICATIONS

GB Combined Search and Examination Report dated Jul. 14, 2014 issued in connection with corresponding GB Application No. GB1319585.4.

(Continued)

*Primary Examiner* — Levi Gannon
(74) *Attorney, Agent, or Firm* — GE Aviation Patent Operation; William Scott Andes

(57) ABSTRACT

An electrical power system for an aircraft having electrical loads and at least one jet engine with a high pressure spool and a low pressure spool, the electrical power system includes a first electrical machine driven by a first pressure spool and outputting a first voltage, a second electrical machine driven by a second pressure spool and outputting a second voltage, and an electrical distribution bus receiving the first and second voltages and supplying the voltages to the loads.

19 Claims, 2 Drawing Sheets

(56) References Cited

U.S. PATENT DOCUMENTS

| | | | |
|---|---|---|---|
| 7,936,086 B2* | 5/2011 | Yue | H02J 1/10 |
| | | | 307/10.1 |
| 7,950,606 B2* | 5/2011 | Atkey | B64D 13/06 |
| | | | 244/135 R |
| 8,723,349 B2 | 5/2014 | Huang et al. | |
| 8,723,385 B2 | 5/2014 | Jia et al. | |
| 2005/0056021 A1* | 3/2005 | Belokon | F02C 3/113 |
| | | | 60/772 |
| 2006/0042252 A1 | 3/2006 | Derouineau | |
| 2008/0006023 A1 | 1/2008 | Lardellier | |
| 2008/0174177 A1* | 7/2008 | Langlois | H02J 1/08 |
| | | | 307/9.1 |
| 2012/0086266 A1 | 4/2012 | Shipley et al. | |
| 2012/0098329 A1* | 4/2012 | Jones | B60L 3/0061 |
| | | | 307/9.1 |
| 2013/0099560 A1 | 4/2013 | Shipley et al. | |
| 2013/0111917 A1 | 5/2013 | Ho et al. | |
| 2013/0154359 A1 | 6/2013 | Huang et al. | |
| 2013/0232941 A1 | 9/2013 | Huang | |
| 2014/0245748 A1* | 9/2014 | Anghel | F01D 15/10 |
| | | | 60/783 |
| 2015/0042155 A1 | 2/2015 | Vieillard et al. | |
| 2015/0100180 A1* | 4/2015 | Oyori | F01D 15/10 |
| | | | 701/3 |

FOREIGN PATENT DOCUMENTS

| | | |
|---|---|---|
| FR | 2 907 761 A1 | 5/2008 |
| FR | 2 988 694 A1 | 10/2013 |
| GB | 2052185 A | 1/1981 |
| GB | 2450778 B | 9/2009 |
| JP | 55160940 A | 12/1980 |
| WO | 2006023981 A1 | 3/2006 |

OTHER PUBLICATIONS

Unofficial English Translation of Japanese Notice of Allowance issued in connection with corresponding JP Application No. 2014-219872 dated Apr. 12, 2016.

Preliminary Search Report and Written Opinion issued in connection with corresponding FR Application No. 1460489 dated Sep. 28, 2017.

* cited by examiner

ELECTRICAL POWER SYSTEM FOR AN AIRCRAFT

CROSS-REFERENCE TO RELATED APPLICATIONS

This application claims priority under 35 U.S.C. § 119 to British Patent Application No. 13195854, filed Nov. 6, 2013, the disclosure of which is incorporated herein by reference.

BACKGROUND OF THE INVENTION

Turbine engines, and particularly gas turbine engines, also known as combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for airplanes, including helicopters. In airplanes, gas turbine engines are used for propulsion of the aircraft.

Gas turbine engines can have two or more spools, including a low pressure (LP) spool that provides a significant fraction of the overall propulsion system thrust, and a high pressure (HP) spool that drives one or more compressors and produces additional thrust by directing exhaust products in an aft direction. A triple spool gas turbine engine includes a third, intermediate pressure (IP) spool.

Gas turbine engines also usually power a number of different accessories such as generators, starter/generators, permanent magnet alternators (PMA), fuel pumps, and hydraulic pumps, e.g., equipment for functions needed on an aircraft other than propulsion. For example, contemporary aircraft need electrical power for avionics, motors, and other electric equipment. A generator coupled with a gas turbine engine will convert the mechanical power of the engine into electrical energy needed to power accessories.

Different accessories may operate with different power requirements, and thus, multiple electrical supply characteristics must be incorporated into the electrical systems. For example, it is common for aircraft to have both AC (alternating current) and DC (direct current) powered accessories. In many commercial aircraft, traditional 115V, 400 Hz power may be provided for the plugging in of common electrical devices, while many of the aircraft system accessories operate on direct current.

The difficulty of providing the proper power for the accessories is exacerbated in that contemporary aircraft, especially commercial aircraft, which include centralized primary and secondary power buses that may operate at different voltages, frequencies, or both. Furthermore, having a centralized primary and secondary power bus increases the spatial and weight requirements due to primary and secondary transmission lines.

This problem is further exacerbated in that the generators coupled to the HP spool and the LP spool, which provide the power for the power system, typically supply different voltages and frequencies, which may not provide no break power transfer to the electrical loads without first converting the power as needed. For example, the power from the generators is first converted from AC to the power system standard of 270V DC or 28V DC, which is then converted as needed for the accessories.

Furthermore, aircrafts accessories have dynamic power requirements that may regularly stress a particular generation system. Such stress may result in inadequate power transmission to electrical loads in the system, or even power disruption, during normal or emergency operation.

BRIEF DESCRIPTION OF THE INVENTION

In one embodiment, an electrical power system for an aircraft having electrical loads and at least one jet engine with a high pressure spool and a low pressure spool, the electrical power system includes a first electrical machine driven by the high pressure spool and outputting a first high DC voltage, a second electrical machine driven by the low pressure spool and outputting a second high DC voltage, and an electrical distribution bus receiving the first and second high DC voltage and supplying the high DC voltage to the electrical loads.

DESCRIPTION OF EMBODIMENTS OF THE INVENTION

The described embodiments of the present invention are directed to power extraction from an aircraft engine, and more particularly to an electrical power system architecture which enables production of electrical power from a turbine engine, preferably a gas turbine engine. It will be understood, however, that the invention is not so limited and has general application to electrical power system architectures in non-aircraft applications, such as other mobile applications and non-mobile industrial, commercial, and residential applications. In one example of the current embodiment, any voltage exceeding +/−270V should be considered a "high voltage." It should be further recognized that voltages at or falling below +/−270 V should be considered "low voltage" for embodiments of the current invention. Although +/−270 V is one example of the high/low voltage distinction, it is contemplated that voltages for aircraft electrical systems may change in the future, and thus, alternate distinctions for high/low voltages are envisioned.

Figure 1:
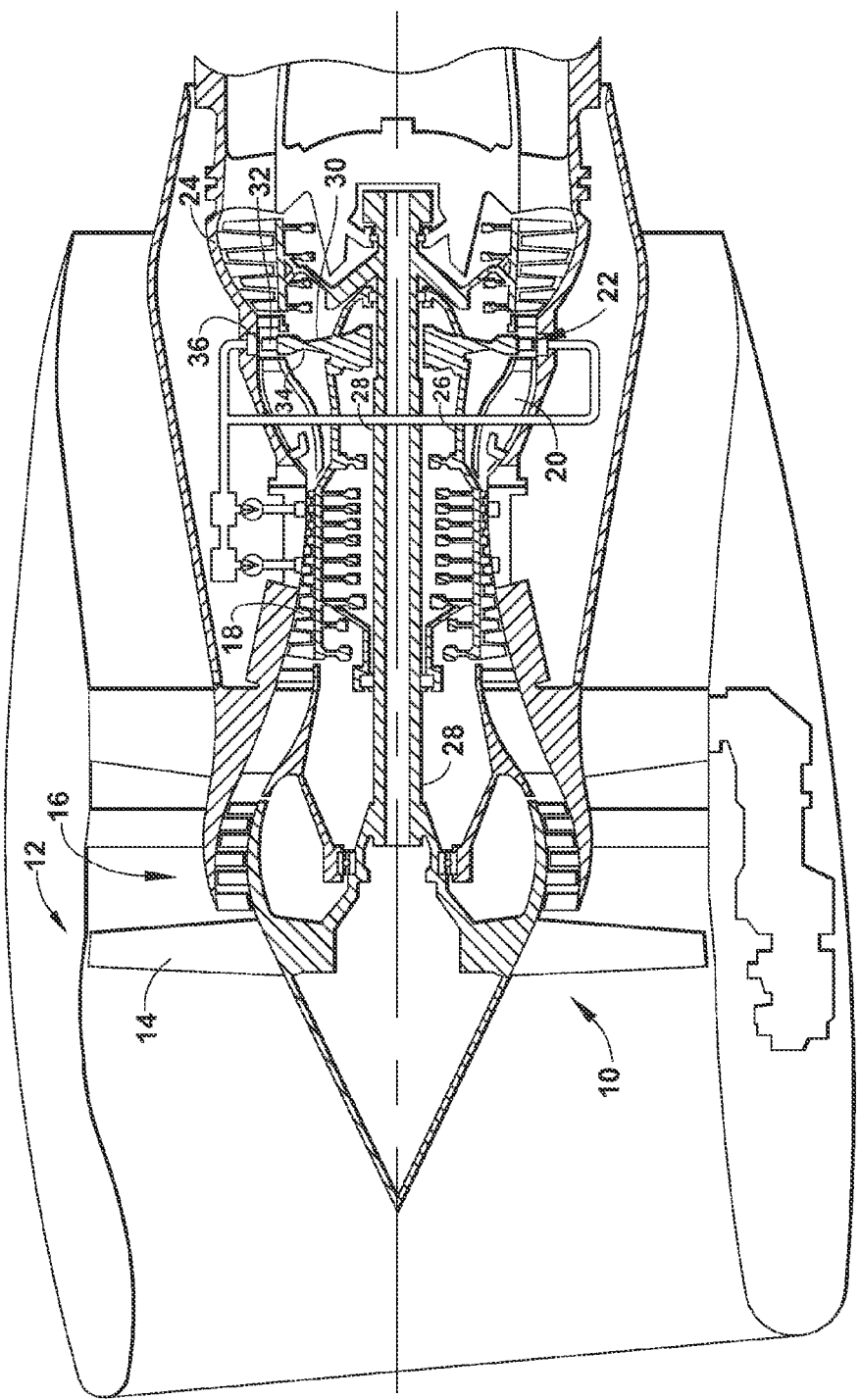
FIG. 1 is a schematic cross-sectional diagram of a gas turbine engine for an aircraft.

FIG. 1 is a schematic cross-sectional diagram of a gas turbine engine 10 for an aircraft. Engine 10 includes, in downstream serial flow relationship, a fan section 12 including a fan 14, a booster or low pressure (LP) compressor 16, a high pressure (HP) compressor 18, a combustion section 20, a HP turbine 22, and a LP turbine 24. A HP shaft or spool 26 drivingly connects HP turbine 22 to HP compressor 18 and a LP shaft or spool 28 drivingly connects LP turbine 24 to LP compressor 16 and fan 14. HP turbine 22 includes an HP turbine rotor 30 having turbine blades 32 mounted at a periphery of rotor 30. Blades 32 extend radially outwardly from blade platforms 34 to radially outer blade tips 36.

Figure 2:
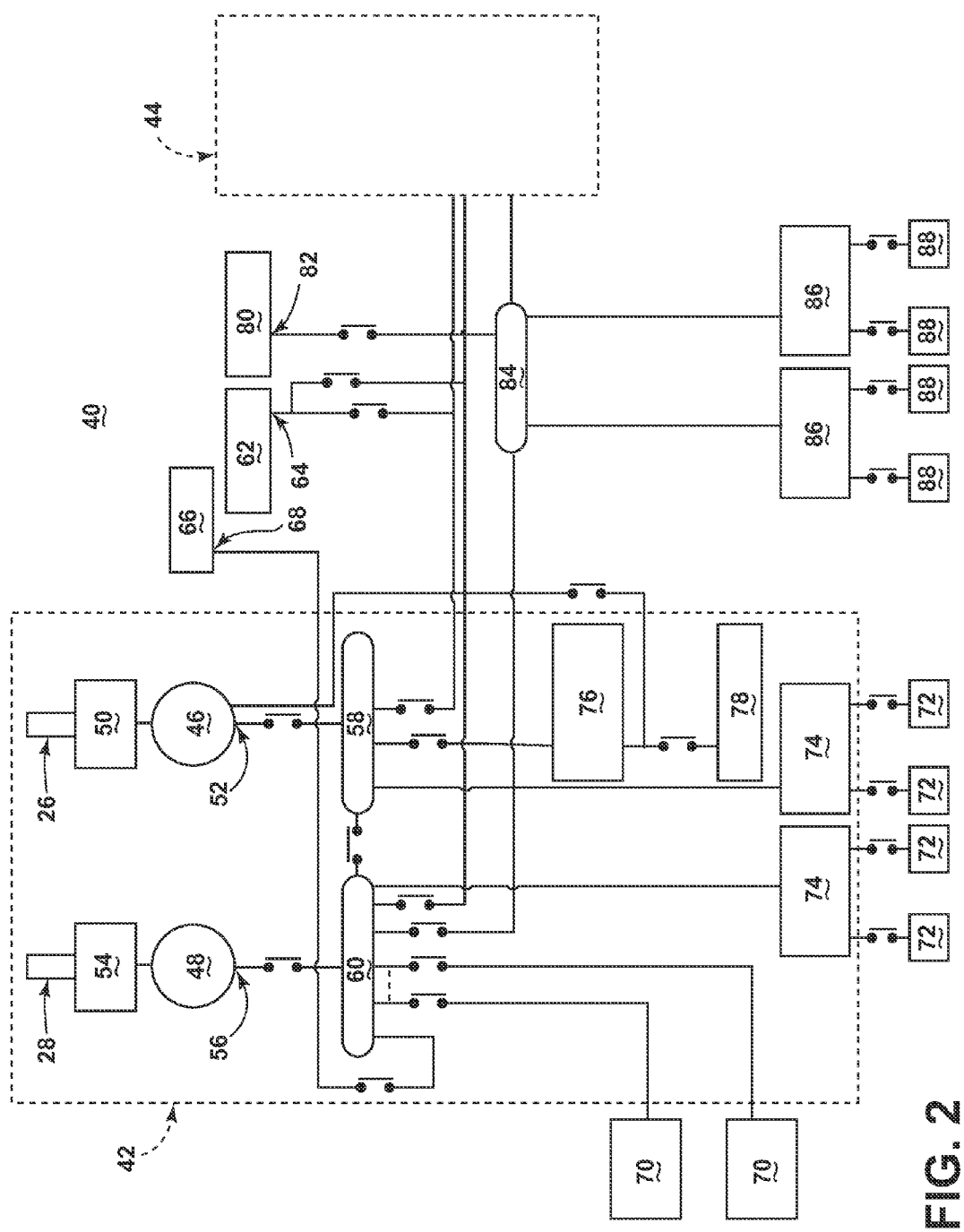
FIG. 2 is a schematic block diagram of an electrical power system for the gas turbine engine of FIG. 1.

FIG. 2 is a schematic block diagram of an electrical power system architecture 40 according to a one embodiment of the invention. The electrical power system architecture 40 includes multiple engine systems, shown herein as including at least a left electrical system 42 and a right electrical system 44. The left and right electrical systems 42, 44 may be substantially identical; therefore, only the left electrical system 42 will be described in detail for the sake of brevity. The left electrical system 42 can include the HP and LP spools 26, 28 of the gas turbine engine 10 shown in FIG. 1.

The left electrical system 42 shown herein uses mechanical power provided by two spools, the HP spool 26 and the LP spool 28. However, the electrical power system architecture 40 could also be implemented on an engine having more than two spools, such as a 3-spool engine having an intermediate pressure spool in addition to the HP and LP spools.

In the embodiment illustrated, the left electrical system 42 includes a first electrical machine, shown herein as a starter-generator 46, configured to produce high DC power from mechanical power supplied by the HP spool 26, and a second electrical machine, shown herein as a generator 48 configured to produce high DC power from mechanical power supplied by the LP spool 28. Although the first electrical machine is shown as a starter-generator 46 and the second electrical machine is shown as a generator 48, it is envisioned that either electrical machine may be a motor, generator, or a combination of both.

Either electrical machine 46, 48 may generate a high DC voltage natively, or alternatively, generate AC voltage which is converted to a high DC voltage. In generating an AC voltage, the electrical machine may have a separate or integrated rectifier and/or filtering circuit electrically coupled to the electrical machine to convert AC voltage into an acceptable high DC voltage. Moreover, either generator may include a separate or integrated autotransformer unit (ATU), which houses some or all of the electrical windings necessary for power transformation, as well as reduces the harmonic contents of the generators and the ripples at the outputs of the rectifiers. If included, multiple primary windings, secondary windings, and desired pulse counts of the ATU are envisioned, as necessary for a particular application.

The HP spool 26 can be operably coupled with the starter-generator 46 by an HP drive assembly having an input mechanically coupled to the HP spool 26 and an output mechanically coupled to the starter-generator 46. One embodiment of the HP drive assembly is an accessory gearbox 50. The starter-generator 46 converts mechanical power supplied by the HP spool 26 into electrical power and produces a first high voltage DC output 52 directly from the electrical machine, which for commercial aircraft is contemplated to be at +/−270 V. Furthermore, the left electrical system 42 can include multiple generators drawing mechanical power from the HP spool 26 to produce power in order to provide a measure of redundancy.

The generator 48 can be operably coupled with the LP spool 28 by an LP drive assembly having an input mechanically coupled to the LP spool 28 and an output mechanically coupled to the generator 48. One embodiment of the LP drive assembly is a speed range reduction drive (SSR) 54 which converts the variable speed input from the LP spool 28 to constant speed. The generator 48 converts mechanical power supplied by the LP spool 28 into electrical power and produces a second high voltage DC output 56 directly from the electrical machine, which, like the first DC output 52, is contemplated to be at +/−270 V for commercial aircraft.

Although the embodiment shown herein is described as using one generator 48 on the LP side of the left electrical system 42, another embodiment of the invention may use multiple generators 48 drawing mechanical power from the LP spool 28 to produce DC power in order to provide a measure of redundancy. Furthermore, while a separate generator 48 and SSR 54 are discussed herein, an integrated drive generator which combines the SSR 54 and generator 48 into a common unit can alternatively be used.

Each of the first and second high voltage DC outputs 52, 56 is supplied to an electrical distribution bus, illustrated as respective first and second primary distribution buses 58, 60. One example of first and second primary distribution buses 58, 60 may include solid-state-based primary electrical power distributions centers (PEPDCs) that provide for electronic-controlled selective power distribution. PEPDCs may be made from silicon carbide (SiC) due to its high temperature capability. The PEPDCs may be made from other suitable solid state materials as well. The PEPDCs allow for the selective connecting and disconnecting of particular electrical loads and parallel high DC voltage sources, as required by the electrical power system architecture 40.

The electrical power system architecture 40 further includes an auxiliary power unit (APU) 62 of the aircraft. As shown herein, the APU 62 has a high voltage DC output 64, which for a commercial aircraft is contemplated to be +/−270 V. One example of an APU 62 is a gas turbine machine, although other APUs 62 are envisioned. The electrical power system architecture 40 yet further includes a load leveling unit (LLU) 66 for each left and right electrical system 42, 44. Each LLU 66 has a high voltage DC input/output 68 wherein the LLU 66 can selectively supply, as well as selectively store excess DC power at 270 V, as required by the electrical power system architecture 40. For example, a LLU 66 may comprise of chemical or fuel cell based batteries. Alternatively, the APU 62 and LLU 66 may be combined into a single unit.

The high voltage DC output 64 of the APU 62 is selectively coupled to the first primary distribution bus 58, and the high voltage DC output 64 of the APU 62 and the high voltage DC input/output 68 of the LLU 66 are selectively coupled to the second primary distribution bus 60. Alternatively, the high voltage DC input/output 68 of the LLU 66 may be selectively coupled to the first primary distribution bus 60, or selectively coupled to both primary distribution buses 58, 60.

The first and second high voltage DC outputs 52, 56, the APU 62 high voltage DC output 64, and the LLU 66 high voltage DC input/output 68 are all configured to supply the same, or substantially similar, voltage to the first and second primary distribution buses 58, 60 so that the voltages can be selectively combined to form a common electrical distribution bus. Additionally, it is contemplated that the each of the high voltage DC outputs 52, 56, 64, 68 may supply power at slightly dissimilar voltages.

The first and second primary distribution buses 58, 60 can be selectively connected to enable the buses 58, 60 to be shared by the starter-generator 46 and the generator 48. Furthermore, each first and second primary distribution bus 58, 60 may selectively connect to other parallel high voltage DC power buses, such as a LLU 66, the APU 62, or to one or more respective high voltage DC power buses from the right electrical system 44.

The electrical power system architecture 40 further comprises high voltage electrical loads 70, such as electronic flight actuators, low voltage electrical loads 72, such as various small motors and electrical equipment, and solid state power conversion units 74. Whereas the high voltage electrical loads 70 typically operate at the high DC voltage (approximately 270 V), the low voltage electrical loads 72 operate at a low DC voltage (approximately 28 V). As illustrated, the high voltage electrical loads 70 are selectively connected to the first primary distribution bus 58, but may alternatively be selectively connected directly to any high voltage bus 58, 60. The previously mentioned list of high voltage and low voltage electrical loads 70, 72 is demonstrative and not exhaustive.

Each low voltage electrical load 72 is selectively connected to a solid state power conversion unit 74, illustrated as a conversion modular power tile (C/MPT), which is further coupled to at least one of the first and second primary distribution buses 58, 60. Moreover, each solid state power conversion unit 74 may allow for a different power conversion per unit 74 or different power conversions per low voltage electrical load 72. For example, one solid state power conversion unit 74 may provide 28 Vdc for low voltage electrical loads 72 while another unit 74 provides 115 Vdc for other loads 72, or alternatively, a single unit 74 may provide 28 Vdc for one load 72 while providing 115 Vdc for another load 72. The solid state power conversion units 74 additionally provide for electronic load distribution by selectively connecting and disconnecting the low voltage electrical loads 72. One suitable type of C/MPT is made from silicon carbide (SiC) due to its high temperature capability. C/MPT devices made from materials other than SiC can be used as well. Although the illustrated example shows two solid state power conversion units 74 and four low voltage electrical loads 72, other configurations, including more or less of each component, are envisioned.

The starter-generator 46 also provides a starting function to the aircraft. Alternatively, the starter-generator 46 on the HP side of the left electrical system 42 may comprise a generator that does not provide a starting function to the aircraft. In this case, a separate starter motor connected to the starter-generator 46 can be provided to perform the starting function for the aircraft. For example, a common motor-starter controller (CMSC) 76 can selectively provide power from the first primary distribution bus 58 to the starter-generator 46 to initiate a starting procedure for the aircraft. For example, a three phase, AC CMSC 76 may be connected to the starter-generator 46 as an AC starter for engine starting. In such an embodiment, the AC CMSC 76 may also provide AC power to additional AC motors 78, such as a cabin air compressor (CAC) for driving an environmental control system (ECS).

In operation, with the gas turbine engine 10 started, HPT 22 rotates the HP spool 26 and the LPT 24 rotates the LP spool. The accessory gearbox 50 is driven by the rotating HP spool 26, and transmits mechanical power from the HP spool 26 to the starter-generator 46. The starter-generator 46 converts mechanical power supplied by the HP spool 26 into electrical power and produces the first high voltage DC output 52. The SSR 54 is driven by the rotating LP spool 28, and transmits mechanical power from the LP spool 28 to the generator 48. The generator 48 converts the mechanical power supplied by the LP spool 28 into electrical power and produces the second high voltage DC output 56. The first and second high voltage DC outputs 52, 56 may be respectively provided to the first and second primary distribution buses 58, 60, configured to selectively supply high voltage DC power to one or more solid state power conversion units 74 as well as one or more high voltage electrical loads 70.

Each first and second primary distribution bus 58, 60 selectively connect and disconnect to the other high voltage DC power buses 58, 60 or high voltage DC outputs 64, 68, 44 in response to the expected or actual electrical needs of the electrical power system architecture 40, to provide balanced, no-interrupt power to the electrical loads. It is additionally contemplated that one or more APUs 62 may be selectively supplying a high voltage DC output 62 at least one of the left and right electrical systems 42, 44, or both systems 42, 44 simultaneously. Furthermore, each first and second primary distribution bus 58, 60 may selectively connect and disconnect the high voltage DC input 68 of the LLU 66.

Additionally, each solid state power conversion unit 74 receives the high DC voltage from the first or second primary distribution bus 58, 60 and selectively supplies a low DC voltage to the low voltage electrical loads 72. Depending on the type of high or low DC voltage electrical load drawing power, the DC power supplied by the electrical power system architecture 40 may undergo further processing before being used by the loads.

During transient periods of high power demand, the first and second primary distribution buses 58, 60 selectively connect and disconnect additional high DC voltage sources, such as a LLU 66, the APU 62, and/or other parallel primary distribution buses 44, 58, 60 in order to provide balanced, no break power transfer to the electrical loads 70, 72. For example, as shown, when a high voltage electrical load 70, such as an electrical flight actuator is operating, the second primary distribution bus 60 may selectively connect to both the first primary distribution bus 58 and a LLU 66 to supply supplemental high voltage DC power so power to other electrical loads 70, 72 connected to the second primary distribution bus 60 is not interrupted. Similarly, the solid state power conversion units 74 may selectively connect and disconnect low voltage electrical loads 72 during transient periods of high or low power demand. Each of the distribution buses 58, 60 and solid state power conversion units 74 may also selectively disconnect non-critical high and low voltage electrical loads 70, 72 to ensure sufficient power is transferred to critical operational systems. Moreover, during low power demand, the second primary distribution bus 60 selectively connects and disconnects the high voltage DC input 68 of the LLU 66 during periods of excess system power, to recharge the LLU 66 for future discharge.

The electrical power system architecture 40 further includes an emergency power system, comprising an emergency power unit (EPU) 80 having a high voltage DC output 82, and an emergency primary distribution bus 84. One example of an emergency primary distribution bus 84 is the aforementioned PEPDC. The high voltage DC output 82 of the EPU 80 and the second primary distribution bus 60 of each left and right electrical systems 42, 44 are selectively coupled in parallel to the emergency primary distribution bus 84. One example of an EPU 80 is fuel cell, although other EPUs 80 are envisioned, such as chemical batteries or ram air turbine (RAT) systems.

The emergency power system may further comprise emergency secondary distribution buses 86 having one or more emergency electrical loads 88 for operating critical operating systems. One example of an emergency secondary distribution bus is the aforementioned C/MPT. In an alternate configuration, the EPU 80 may be selectively coupled to at least one of the first and second primary distribution buses 58, 60. In another alternate configuration, the emergency primary distribution bus 84 may be selectively connected to the first primary distribution bus 58, or the emergency primary distribution bus 84 may be selectively connected to both the first and second primary distribution buses 58, 60.

During emergency operation, the EPU 80 selectively supplies high DC voltage to the emergency primary distribution bus 84. Additionally, the second primary distribution bus 60 may or may not supply power to the emergency primary distribution bus 84. For example, if sufficient airstream flows over the fan section 12 of the gas turbine engine 10, the LP spool 28 will rotate, providing mechanical power and consequently, electrical power transferred from the generator 48 to the second primary distribution bus 60. Similar to the aforementioned secondary distribution buses, the emergency secondary distribution buses 86 convert the high DC voltage to a low DC voltage and selectively supplies the power to the emergency electrical loads 88. Additional (non-emergency) high voltage and low voltage electrical loads 70, 72 may also be operational during emergency operation and may be powered wholly or partially by the EPU 80 through the emergency primary distribution bus 84. Moreover, additional high DC voltage may be supplied during emergency operation by a combination of a starter-generator 46, APU 62, or LLU 66, depending on the nature of the emergency.

The system architecture disclosed herein provides an electrical power system for an aircraft. One advantage that may be realized in the practice of some embodiments of the described systems is that the system operates in a high DC voltage primary distribution state, allowing for thinner and lighter wiring associated with the smaller current, compared to a AC or low voltage system. The conventional, centralized secondary buses are eliminated, as well as additional low voltage transmission lines. Thus, this arrangement significantly reduces the weight and spatial requirements of the system, two important considerations for aircraft, and can simplify the cooling for engine components.

Another advantage that may be realized in the practice of some embodiments of the described systems and methods is that DC power can be extracted from both spools 26, 28 of a gas turbine engine 10. The operating efficiency of the gas turbine engine 10 is also increased by seamlessly controlling the power drawn from HP and LP spools 26, 28. In addition to the DC power drawn from the HP and LP spools 26, 28, the respective DC outputs 62, 68 from the APU 62 and the LLU 66 can be integrated to provide no break power transfer (NBPT).

Another advantage that may be realized in the practice of some embodiments of the described systems and methods is that the system architecture(s) can offer a level of redundant DC power generation, since DC power can be extracted from the LP spool 28 as well as the HP spool 26 of the gas turbine engine 10. Drawing power from both spools 26, 28 offers increased redundancy for DC power, such that in the event of a failure of one of the spools 26, 28 or generators in either electrical system 42, 44, DC power may still be extracted from the remaining operational spools 26, 28 and generators.

Still another advantage that may be realized in the practice of some embodiments of the described systems and methods is the avoidance of engine stall issues that are typically encountered during a descend mode of the aircraft by sharing the DC load between the HP and LP spools 26, 28. Being able to draw power from the LP spool as well as the HP spool allows the aircraft to run at lower rpms during descent without risk of stall, thereby preserving fuel efficiency of the aircraft.

Yet another advantage that may be realized in the practice of some embodiments of the described systems and methods is that both AC and DC power can be extracted from the gas turbine engine 10. One embodiment of the invention described herein in particular provides a system architecture which gives an air framer access to both types of power, such that an air framer can select either type of power for a particular application on an aircraft.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electrical power system for an aircraft having electrical loads, comprising:
   a first electrical machine driven by a high pressure spool of a jet engine and outputting a first high direct current (DC) voltage;
   a second electrical machine driven by a low pressure spool of the jet engine and outputting a second high DC voltage;
   a first distribution bus, receiving the first high DC voltage, supplying at least some of the electrical loads with the first high DC voltage;
   a second distribution bus, receiving the second high DC voltage, supplying at least some of the electrical loads with the second high DC voltage, wherein the first and second distribution buses are selectively coupled in parallel; and
   a load leveling unit selectively coupled to the second distribution bus, wherein the load leveling unit comprises a battery.

2. The electrical power system of claim 1 wherein the first high DC voltage and the second high DC voltage are the same voltage.

3. The electrical power system of claim 2 wherein the same voltage is +/−270 Vdc.

4. The electrical power system of claim 1 wherein the load leveling unit is selectively coupled to the first distribution bus.

5. The electrical power system of claim 1 further comprising an auxiliary power unit selectively coupled to at least one of the first and second distribution buses.

6. The electrical power system of claim 1 wherein an auxiliary power unit is selectively coupled to both the first and second distribution buses.

7. The electrical power system of claim 1 further comprising an emergency power unit selectively coupled to at least one of the first and second distribution buses.

8. The electrical power system of claim 7, the emergency primary unit comprises at least one of a fuel cell or a battery.

9. The electrical power system of claim 7, wherein an auxiliary power unit and the load leveling unit are a single unit.

10. The electrical power system of claim 1 wherein the first and second electrical machines and the first and second distribution buses define an engine power system, which is provided for the jet engine.

11. The electrical power system of claim 1 further comprising a motor starter controller selectively, electrically connectable to the electrical distribution bus and at least one of environmental control system or cabin air compressor.

12. The electrical power system of claim 1 wherein the second electrical machine comprises a generator outputting the second high DC voltage and the first electrical machine comprises a starter/generator outputting the first high DC voltage.

13. The electrical power system of claim 12 wherein at least one of the starter/generator and the generator comprises multi-phase windings electrically coupled to a rectifier.

14. The electrical power system of claim 12 further comprising a speed range reduction unit coupling the low pressure spool to the generator.

15. The electrical power system of claim 1 further comprising:
- an auxiliary power unit selectively coupled between the first and second distribution buses;
- an emergency power unit selectively coupled to the second distribution bus; and
- a motor starter controller selectively, electrically connectable between the first distribution bus and at least one of an environmental control system or a cabin air compressor.

16. The electrical power system of claim 1, wherein during transients, at least one of the first or second distribution buses at least one of selectively connect or disconnect at east one of additional high DC voltage sources, or parallel primary distribution buses to provide balanced, no break power transfer to the electrical loads.

17. The e ectrical power system of claim 1, wherein at least one of the first or second distribution buses includes a solid-state-based primary electrical power distribution center.

18. The electrical power system of claim 17, wherein the solid-state-based primary electrical power distributions center comprises a silicon carbide solid-state-based primary electrical power distribution center.

19. The electrical power system of claim 1, wherein at least one of the first or second distribution buses selectively connect or disconnect at least one of additional high DC voltage sources in response to expected or actual electrical needs.

* * * * *